(12) United States Patent
Wietelmann

(10) Patent No.: US 9,147,883 B2
(45) Date of Patent: *Sep. 29, 2015

(54) METHOD FOR PRODUCING A CARBON-COATED LITHIUM SULFIDE AND USE THEREOF

(75) Inventor: Ulrich Wietelmann, Friedrichsdorf (DE)

(73) Assignee: Rockwood Lithium GmbH, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/124,138

(22) PCT Filed: Jun. 12, 2012

(86) PCT No.: PCT/EP2012/061059
§ 371 (c)(1),
(2), (4) Date: Dec. 5, 2013

(87) PCT Pub. No.: WO2012/171889
PCT Pub. Date: Dec. 20, 2012

(65) Prior Publication Data
US 2014/0124708 A1    May 8, 2014

(30) Foreign Application Priority Data
Jun. 14, 2011   (DE) .................... 10 2011 077 481

(51) Int. Cl.
| | |
|---|---|
| *C01B 17/22* | (2006.01) |
| *H01M 4/136* | (2010.01) |
| *C01G 1/12* | (2006.01) |
| *H01M 4/62* | (2006.01) |
| *H01M 2/16* | (2006.01) |
| *H01M 4/1397* | (2010.01) |
| *H01M 4/36* | (2006.01) |
| *H01M 4/58* | (2010.01) |
| *H01M 10/052* | (2010.01) |

(52) U.S. Cl.
CPC .............. *H01M 4/625* (2013.01); *C01B 17/22* (2013.01); *C01G 1/12* (2013.01); *H01M 2/1646* (2013.01); *H01M 4/136* (2013.01); *H01M 4/1397* (2013.01); *H01M 4/366* (2013.01); *H01M 4/5815* (2013.01); *C01P 2002/52* (2013.01); *C01P 2002/54* (2013.01); *C01P 2002/72* (2013.01); *C01P 2002/85* (2013.01); *C01P 2004/03* (2013.01); *C01P 2004/30* (2013.01); *C01P 2006/40* (2013.01); *C01P 2006/80* (2013.01); *H01M 10/052* (2013.01); *Y02E 60/122* (2013.01)

(58) Field of Classification Search
CPC . H01M 4/625; H01M 4/5825; H01M 10/052; H01M 4/131
USPC .................................................. 252/506, 500
See application file for complete search history.

(56) References Cited

U.S. PATENT DOCUMENTS 3,615,191 A  *  10/1971  Bach et al. ................. 423/566.2

FOREIGN PATENT DOCUMENTS

| JP | 2010-163356 A | 7/2010 |
|---|---|---|
| WO | WO 2010035602 A1 * | 4/2010 |

OTHER PUBLICATIONS

Hassoun, et al. "A High-Performance Polymer Tin Sulfur Lithium Ion Battery", Angew. Chem. 122 (2010), pp. 2421-2424.
Jacoby, Mitch "Rechargeable metal-air batteries", www.CEN-ONLINE.ORG , (2010), pp. 29-31.
Li, et al. "Electrochemical properties of the soluble reduction products in rechargeable Li/S battery", Journal of Power Sources, 195 (2010), pp. 2945-2949.
Takeuchi, et al. All-Solid-State Lithium Secondary Battery with Li.
Hassoun, et al. "A High-Performance Polymer Tin Sulfur Lithium Ion Battery", Angew. Chem., 122, (2010), pp. 2421-2424, Weinheim, DE.
Pearson, et al. "The Polysulphides of the Alkali Metals", J. Chem. Soc., (1931), pp. 413-420.

* cited by examiner

*Primary Examiner* — Mark Kopec
*Assistant Examiner* — Danny N Kang
(74) *Attorney, Agent, or Firm* — Norton Rose Fulbright US LLP

(57) ABSTRACT

The invention relates to a novel method for producing a carbon-doped lithium sulfide powder, according to which elementary lithium is reacted with elementary sulfur and/or a sulfur-containing compound selected from the group containing $CS_2$, COS, $SO_2$ and SO, in a liquid state, in a hydrocarbon solvent except naphthalene. The products of the method according to the invention are used to produce lithium battery electrodes or a lithium-ion-conducting solid.

21 Claims, 10 Drawing Sheets

METHOD FOR PRODUCING A CARBON-COATED LITHIUM SULFIDE AND USE THEREOF

This application is a §371 of International Application No. PCT/EP2012/061059 filed Jun. 12, 2012, and claims priority from German Patent Application No. 10 2011 077 481.5 filed Jun. 14, 2011.

FIELD OF THE INVENTION

The invention relates to a method for producing a carbon-coated lithium sulfide, and use thereof.

BACKGROUND OF THE INVENTION

Rechargeable electrochemical storage systems are presently becoming increasingly important in many areas of everyday life. In addition to the long-standing applications as automobile starter batteries and as an energy source for portable electronic devices, considerable growth is predicted in the future for electric automobile drives and for stationary energy storage. Traditional lead/sulfuric acid accumulators are not suitable for the new applications because their capacity is far too low, and they cannot be cycled frequently enough. In contrast, the best prospects are seen with lithium batteries.

However, lithium accumulators according to the prior art likewise have too little energy storage capacity for many applications. Present lithium-ion batteries have specific energy densities between approximately 100 and 250 Wh/kg. In addition, they usually contain costly elements such as cobalt and/or nickel. Lithium/sulfur and lithium/air systems have much higher (theoretical) energy densities:

| Battery system | Theoretical energy density | |
|---|---|---|
| | Wh/L | Wh/kg |
| Li ion (LiC$_6$/Ni, Mn, Co oxide) | 1710 | 510 |
| Lithium/sulfur | 2710 | 2450 |
| Lithium/air | | 5830 |

The technical challenges in the development of Li/air systems are still so great that a marketable system is not expected for at least another 10-20 years (M. Jacoby, Chem. Eng. News Nov. 22 (2010) 29-31). The prospects for the lithium/sulfur system appear to be much more favorable. One drawback of this system is the use of lithium metal anodes. Lithium metal is relatively costly compared to saline materials or the graphite used in lithium-ion batteries. In addition, this battery has the further disadvantage that it loses capacity too rapidly during charging and discharging.

It has therefore been proposed to assemble the lithium/sulfur battery in the discharged state; i.e., a lithium-free (or low-lithium) material such as a tin/carbon composite is used as the anode, and lithium sulfide is used as the cathode (B. Scrosati, Angew. Chem. 2010, 122, 2421-2424). Unfortunately, this battery configuration has likewise proven to have insufficient cyclical stability. The main reason is that soluble oligosulfur compounds (Li$_2$S$_3$ and Li$_2$S$_4$, for example) may form during cycling. As a result, the cathode loses redox-active material (Y. Li, J. Power Sources 195 (2010) 2945-2949; D. Aurbach, J. Electrochem. Soc. 156 (8), A694-A702 (2009)). To improve the conductivity of the cathode material (sulfur or lithium sulfide), formation of a composite with carbon is often resorted to. Thus, T. Takeuchi has reported that commercially available sulfide powder may be coated with graphitic carbon in an arc plasma process (J. Electrochem. Soc. 157 (11) A1196-A1201 (2010)). However, such coating processes are energy-intensive and require expensive coating equipment and high-vacuum technology, and consequently entail high costs. Another approach to producing Li$_2$S/C composites is to grind commercially available lithium sulfide powder in a ball mill, for example (B. Scrosati, Angew. Chem. 2010, 122, 2421-2424). Grinding processes likewise have a fairly complicated technology and require the availability of finished components. Lithium sulfide is obtainable from the chemical trade, but only at high cost, for example € 560.00 for 50 g from Alfa Aesar (list price, 2011-2013 catalog edition). Lastly, it is known that the reaction of lithium with sulfur in boiling naphthalene results in a main product having the approximate composition of Li$_2$S and containing impurities of free metal (elemental lithium), carbides, and polysulfides (T. G. Pearson and P. L. Robinson, J. Chem. Soc. 1931, 413-420).

DESCRIPTION OF THE INVENTION

The object of the invention is to provide a method involving the cost-effective production of lithium sulfide having a large surface, and the cost-effective formation of a composite of same with conductivity-increasing accompanying substances, preferably carbon.

The object is achieved by a method which allows the simultaneous production of lithium sulfide having a large surface and formation of a composite of same with a conductivity-increasing additive.

To this end, the raw materials lithium metal and sulfur and/or a sulfur-containing compound selected from the group comprising CS$_2$, COS, SO, SO$_2$ are reacted in a hydrocarbon-based solvent (with the exception of naphthalene) at temperatures above approximately 120° C. to 300° C., preferably above 150° C. to 250° C., particularly preferably above 180° C. to 200° C. The solvent is preferably selected from the group of saturated hydrocarbons. It has surprisingly been found that when saturated hydrocarbons are used as the solvent, a product in a pure phase which is coated or doped with noncrystalline ("X-ray amorphous") carbon is obtained. When aromatic or partially aromatic solvents are used, products containing lithium carbide or lithium hydride impurities are often obtained. Solvents are preferably used which are liquid under the reaction conditions, i.e., which have boiling points of at least 120° C., more preferably at least 150° C., and particularly preferably boiling points >180° C. Examples include octane, nonane, decane, undecane, dodecane, or any given mixtures of these compounds, whether they are linear, branched, or cyclic. Commercially available paraffin boiling fractions such as Shellsol®D70 or D100 are very particularly preferred.

The carbon content of the materials according to the invention is between 0.5% and 50%, preferably between 1% and 20%. The carbon content may be varied in a targeted manner by selecting the reaction conditions (primarily the temperature) and by selecting the sulfur raw material. Higher carbon contents are obtained in particular by using carbon-containing sulfur compounds, preferably carbon disulfide (CS$_2$) and/or carbonyl sulfide (COS). The reaction may proceed using only these compounds as the sulfur source according to

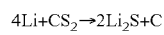
$$4Li+CS_2 \rightarrow 2Li_2S+C$$

or

$$4Li+COS \rightarrow Li_2S+Li_2O+C.$$

In one very particularly preferred embodiment, a mixture of elemental sulfur and carbon disulfide is used. The molar ratio to be selected depends on the desired C content. In general, the molar ratio of sulfur to carbon disulfide may vary between 99:1 and 1:99, particularly preferably between 50:50 and 95:5. It is preferred that the sulfur source is used at least in the stoichiometry necessary for complete reaction or in excess (1% to 30%).

The method according to the invention is preferably carried out as a one-step process, in particular as a one-vessel process.

The product according to the invention is characterized by a high specific surface as the result of a cauliflower-like morphology. Since the achievable current density of electrode materials is scaled to the specific surface, among other factors, materials structured in this way are also suitable for achieving relatively high power, such as that necessary for automotive drive batteries, for example.

The lithium sulfide/carbon composite materials according to the invention are used for the production of lithium battery electrodes or the production of lithium ion-conductive solids, for example for use as a separator in lithium batteries.

The invention is explained in greater detail below with reference to five examples and ten figures.

The analyses of the crystalline structure and the assignments were conducted using the AXS (Discover D8) from Bruker; Cu K-α radiation, Sol X detector under the following conditions: Start: 5°—end: 75° (2 theta measuring range); 2 s measuring time/0.02° measuring increment; temperature: 25° C.

EXAMPLES

EXAMPLE 1

Production of $Li_2S$/C Composite from Sulfur and Lithium Powder at Approximately 140° C. in Paraffin Oil, Receiving Vessel Containing Sulfur 19.8 g powdered sulfur in 520 g Shellsol® D100 was placed in an inerted (i.e., free of water and air, filled with Ar) stainless steel double-shell reactor, and was melted/dissolved at a 140° C. shell temperature, with stirring. 8.33 g lithium powder was then added in portions (1 g per mol) through a reactor opening. The reaction was exothermic, as shown by a rise in the internal temperature from 136° C. to just under 140° C. After the last portion was added, stirring was continued for 1 h at 150° C., and the mixture was then cooled to 80° C. and the suspension was pressed onto a filter frit using a Teflon immersion tube, washed (first with Shellsol®, then tree times with pentane), and dried to a constant weight at room temperature (RT). A quantitative product yield (99.8% of theoretical) was obtained. The powder was free-flowing with a grayish-brown tint.

Figure 1:
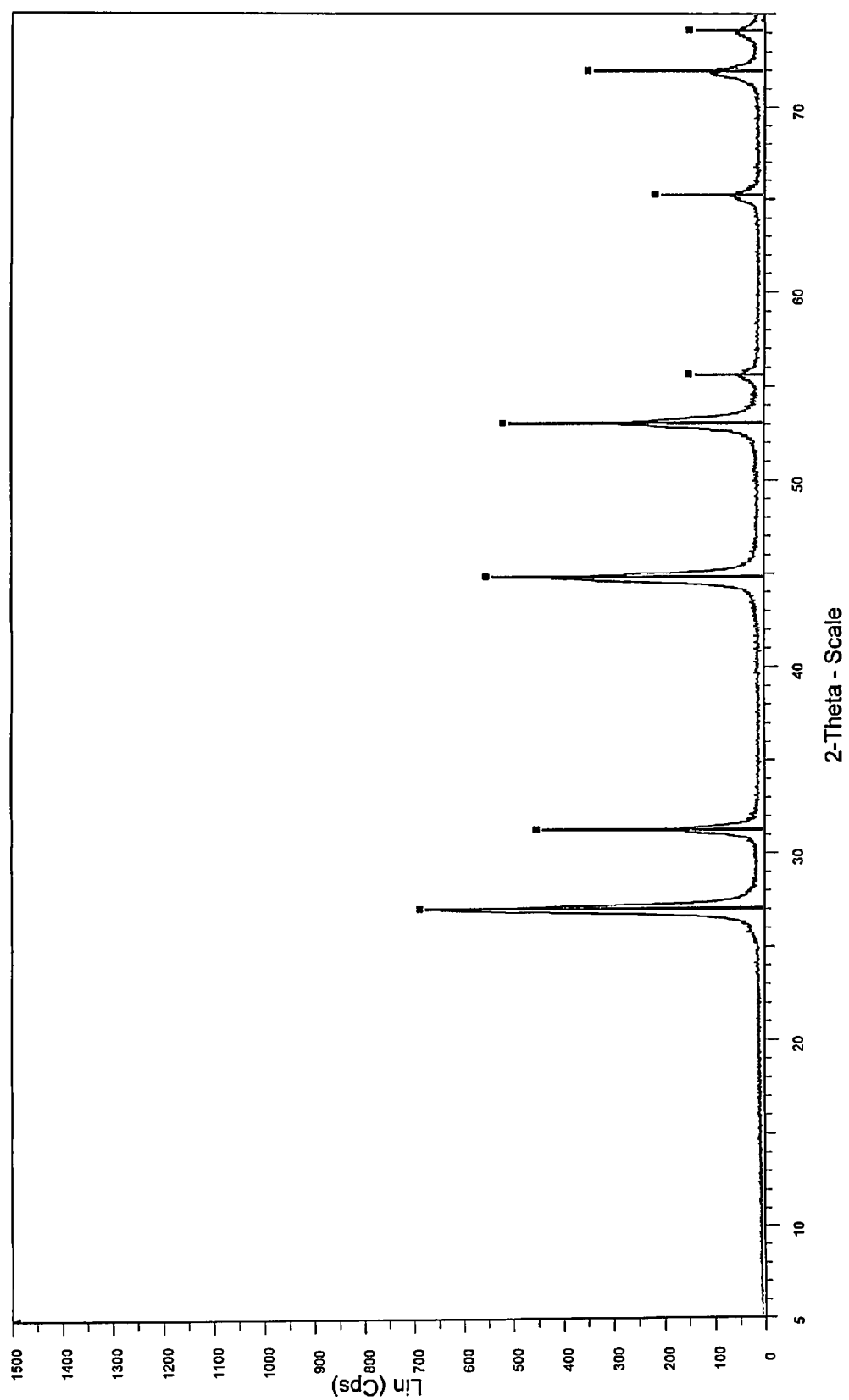
FIG. 1—UEL 10 153 ($Li_2S$ from Li and S), crystalline phase—lithium sulfide ($Li_2S$) (red lines)
Figure 2:
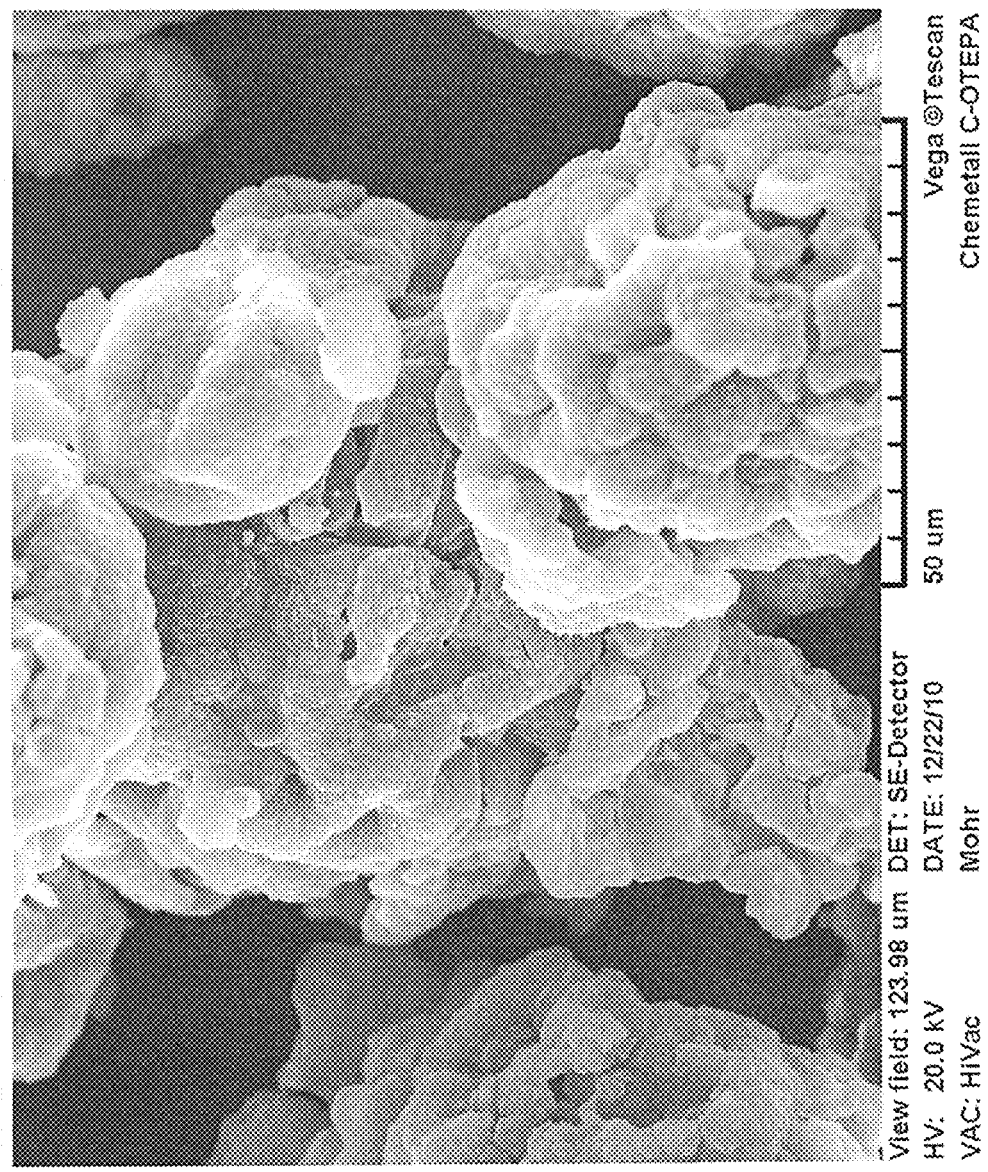
FIG. 2—Scanning electron microscope (SEM) recording from Example 1

XRD: Lithium sulfide in a pure phase (FIG. 1)
SEM: Cauliflower-like surface structure (FIG. 2)

EXAMPLE 2

Production of $Li_2S$/C Composite from Sulfur and Lithium Powder at Approximately 190° C. in Paraffin Oil, Receiving Vessel Containing Lithium 9.24 g lithium metal in 497 g Shellsol® D100 was melted in the reactor according to Example 1. 21.98 g powdered sulfur was metered in in portions over a period of approximately 1 h at an internal temperature of approximately 190° C., with stirring. After the addition was complete, stirring was continued for 2 h at 190° C. and the mixture was then cooled. After filtration and vacuum drying, 32.1 g of a dark gray, very free-flowing powder was obtained.

Figure 3:
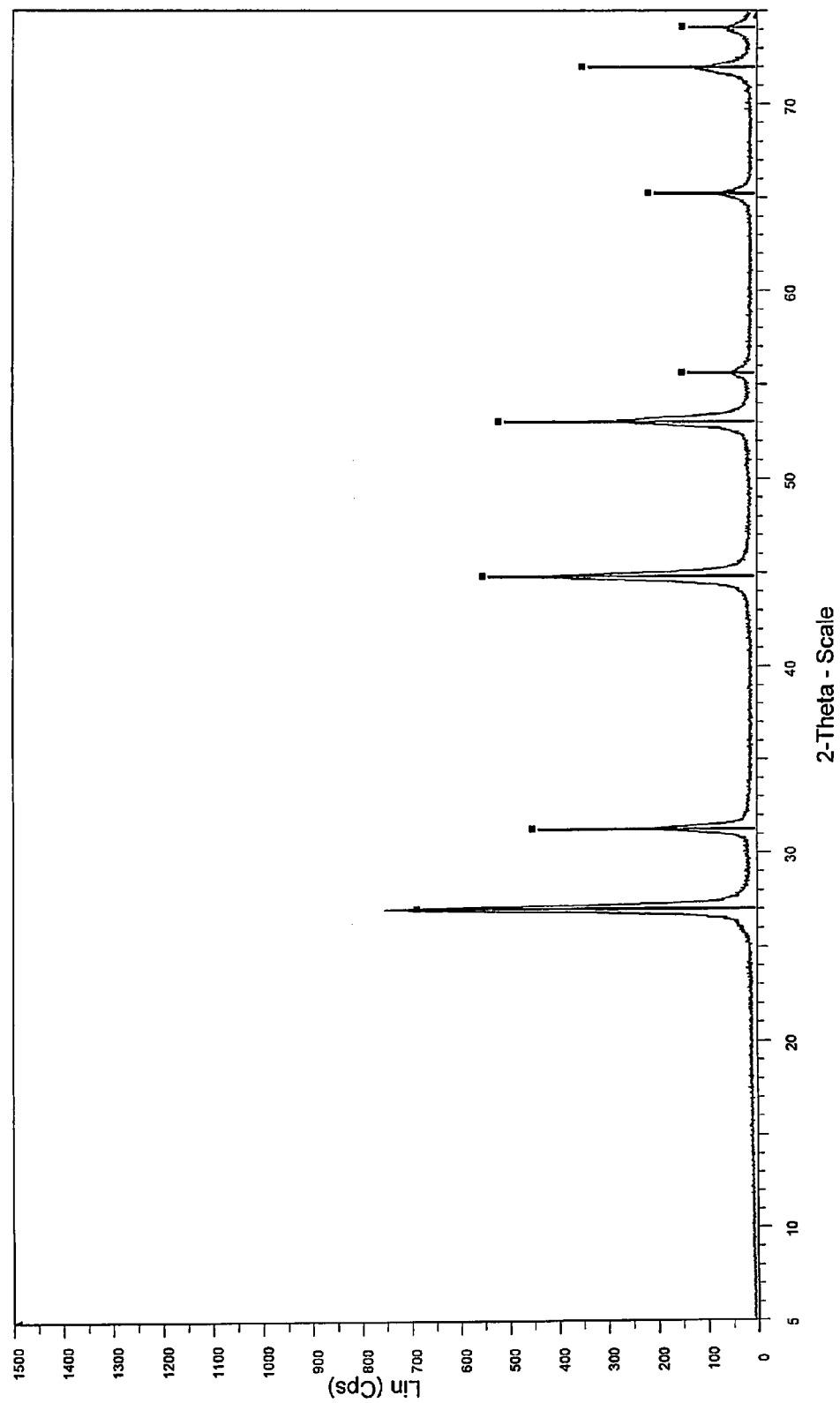
FIG. 3—UEL 10 162 ($Li_2S$ from Li and S), crystalline phase—lithium sulfide ($Li_2S$) (red lines)
Figure 4:
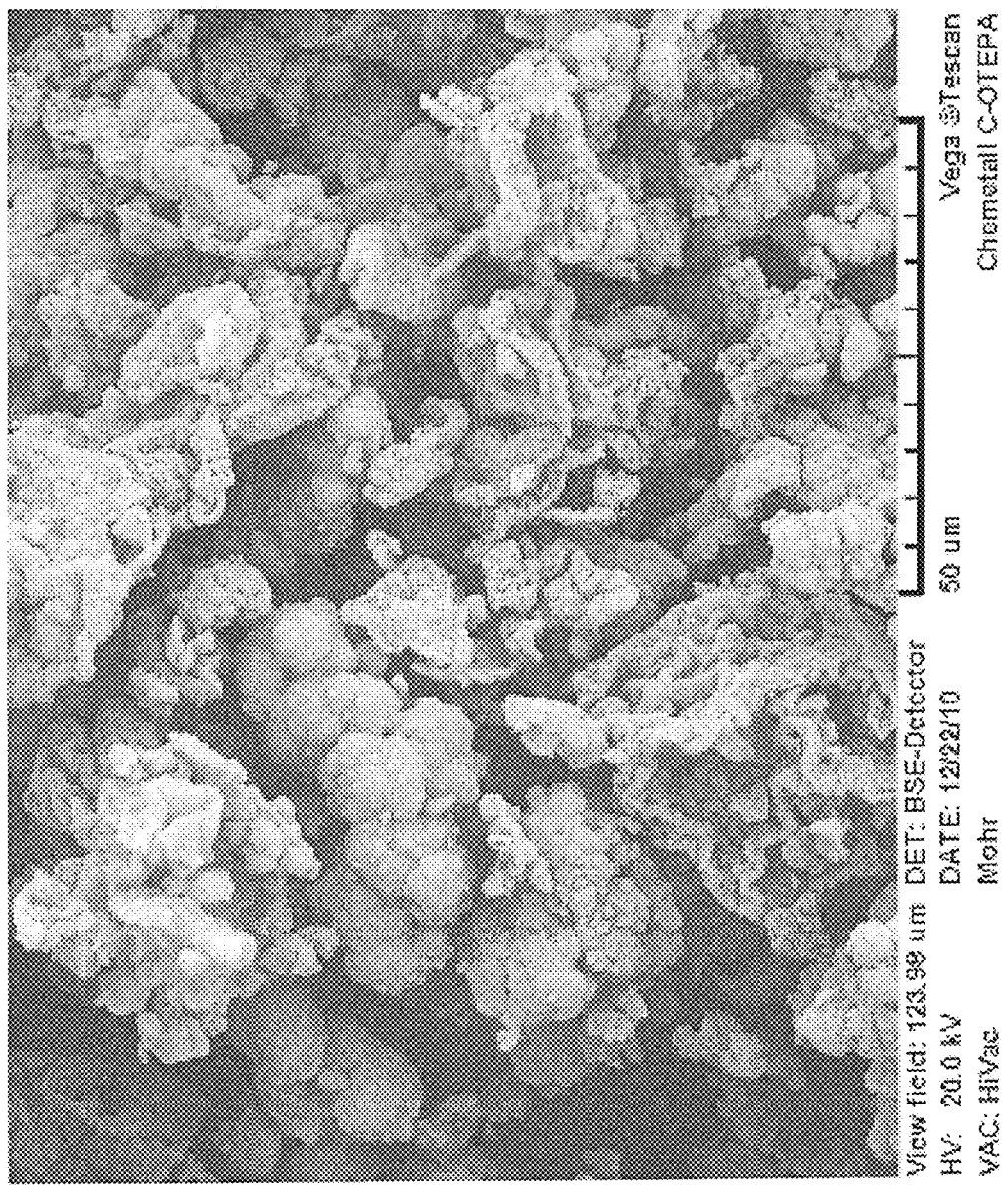
FIG. 4—SEM recording from Example 2

XRD: Lithium sulfide in a pure phase (FIG. 3)
SEM: Cauliflower-like surface structure (FIG. 4)
C content: 4.7%
Li content: 41.1 mmol/g; S content: 20.5 mmol/g (→94% $Li_2S$ content)

EXAMPLE 3

Production of $Li_2S$/C Composite from Sulfur/Carbon Disulfide and Lithium Powder at 190° C. in Paraffin Oil, Receiving Vessel Containing Lithium, and Secondary Reaction at 190° C.

9.98 g lithium in 504 g Shellsol® D-100 was melted in the reactor according to Example 1. 15.8 g powdered sulfur was metered in in portions at an internal temperature of 185° C., with good stirring. A 30% solution of 5.6 g carbon disulfide in Shellsol® D100 was then added dropwise over a period of 15 minutes. After the addition was complete, additional sulfur (8.0 g) was added. After stirring for 2 h at 190° C., the mixture was cooled and the product was isolated (35.1 g of an almost black powder).

Figure 5:
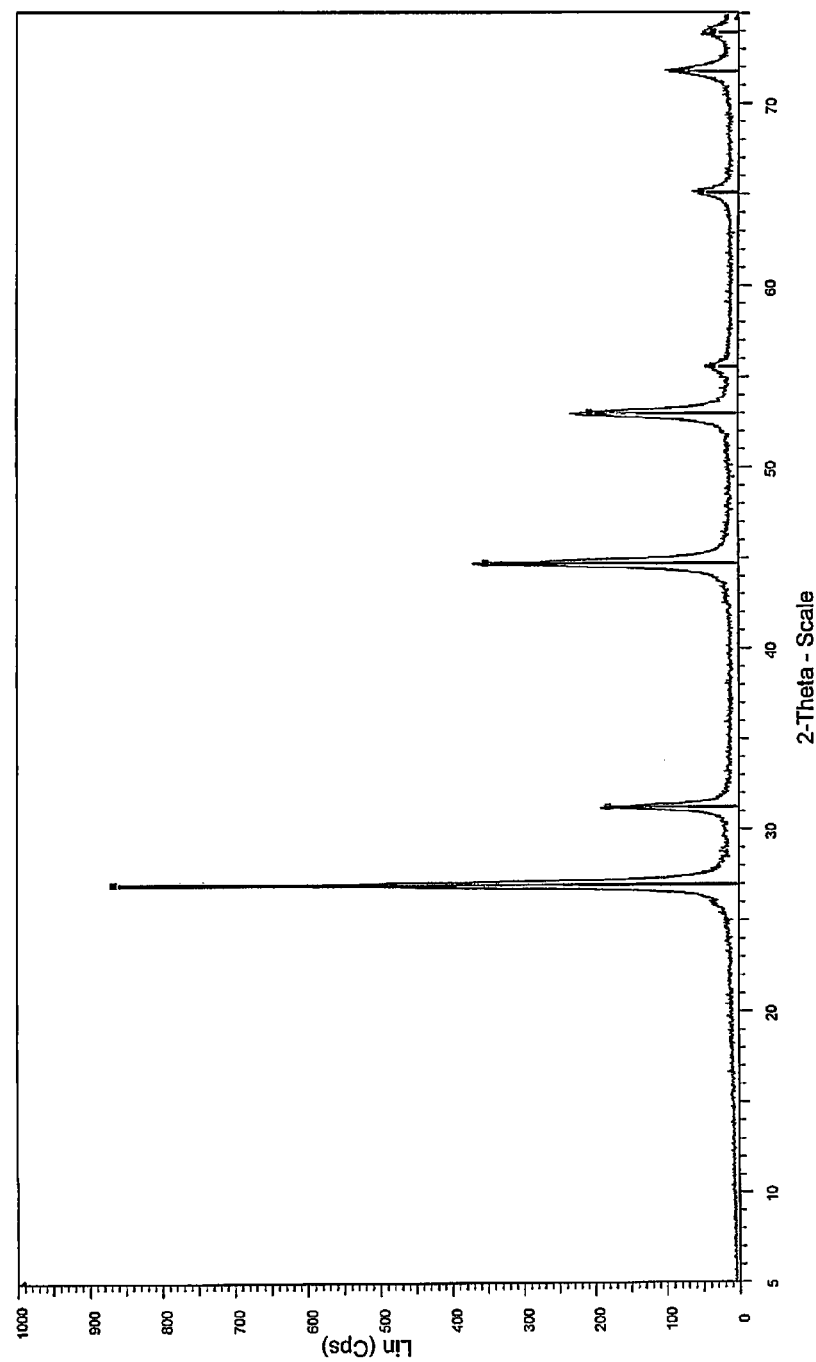
FIG. 5—UEL 11 044 (gray sample), crystalline phase—lithium sulfide ($Li_2S$) (red lines)
Figure 6:
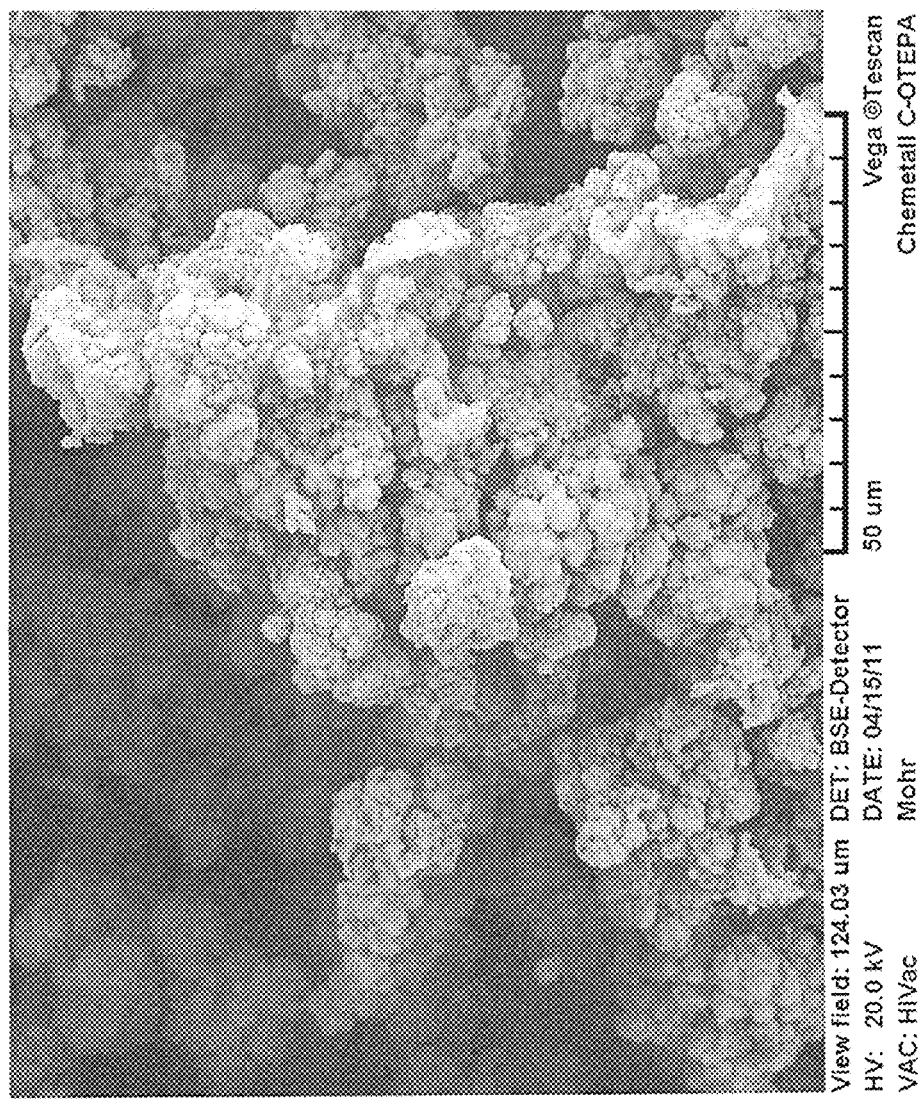
FIG. 6—SEM recording from Example 3

XRD: Lithium sulfide in a pure phase (FIG. 5)
SEM: Cauliflower-like surface structure (FIG. 6)
C content: 7.2%
Li content: 39.9 mmol/g; S content: 20.0 mmol/g (→92% $Li_2S$ content)

EXAMPLE 4

Figure 7:
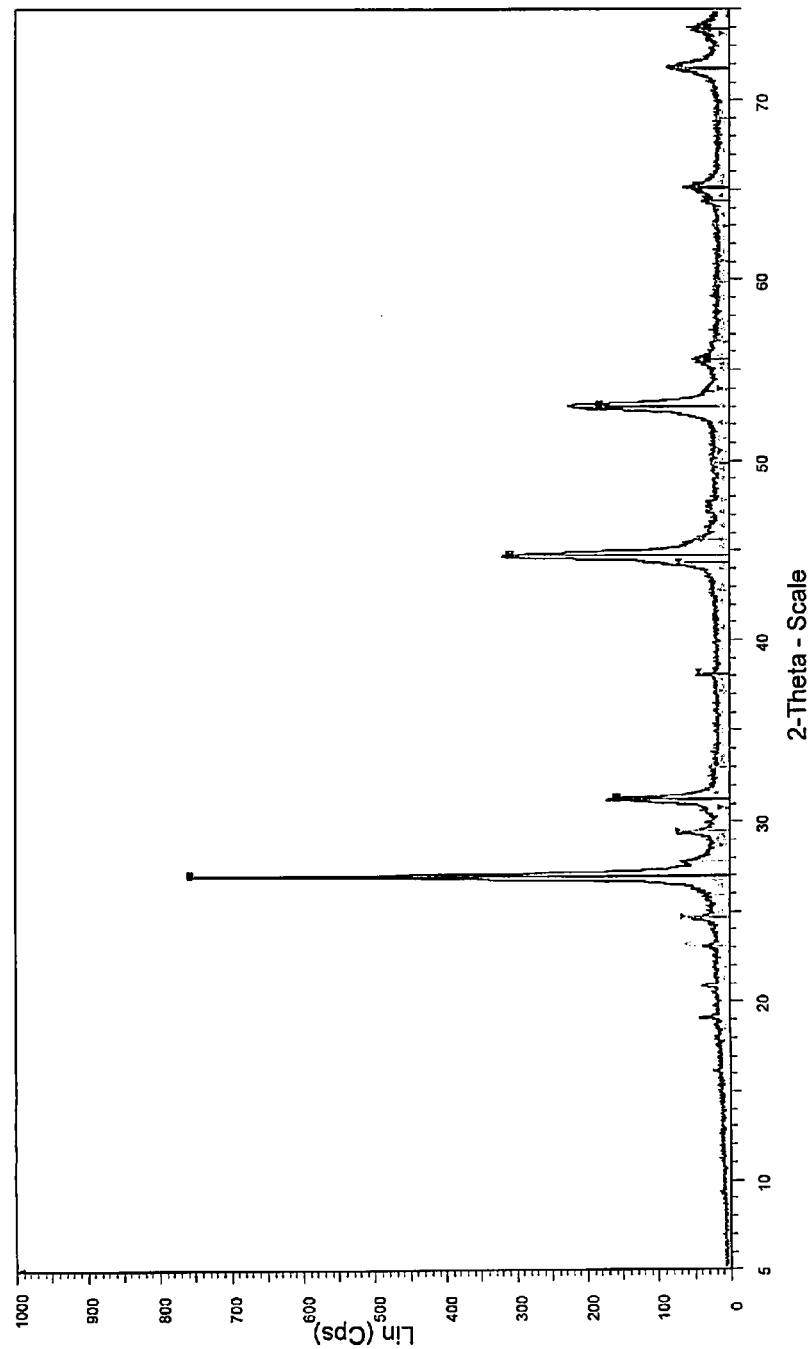
FIG. 7—UEL 11 043 crystalline phase—lithium sulfide ($Li_2S$) (red lines); sulfur (S) (green lines); lithium hydride (LiH) (blue lines); lithium acetylide ($Li_2C_2$) (orange lines)
Figure 8:
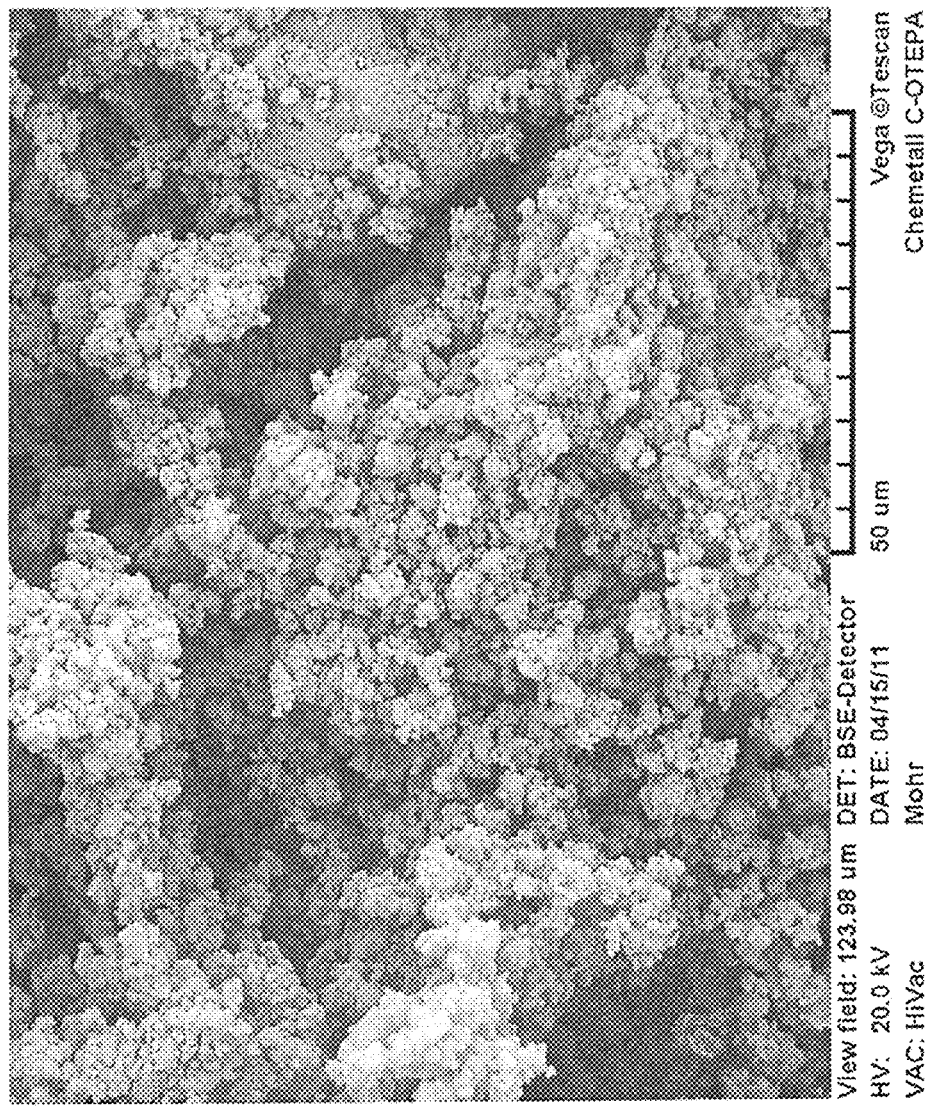
FIG. 8—SEM recording from Example 4

Production of $Li_2S$/C Composite from Sulfur and Lithium Powder at Approximately 190° C. in Biphenyl 7.67 g lithium in 450 g biphenyl was melted in the reactor according to Example 1. 18.25 g powdered sulfur was metered in in portions over a period of 1 h at an internal temperature of approximately 190° C. After metering was complete, stirring was continued for 2 h at 190° C. The mixture was cooled to 120° C., and 500 mL decane was added (to prevent solidification). The mixture was then hot-filtered and washed with heptane, and the filter residue was vacuum-dried. 25.8 g of a dark gray product was obtained.
XRD: Lithium sulfide with LiH and $Li_2C_2$ impurities (FIG. 7)
SEM: Cauliflower-like surface structure (FIG. 8)
C content: 6%
Li content: 40.0 mmol/g; S content: 10.0 mmol/g

EXAMPLE 5

Figure 9:
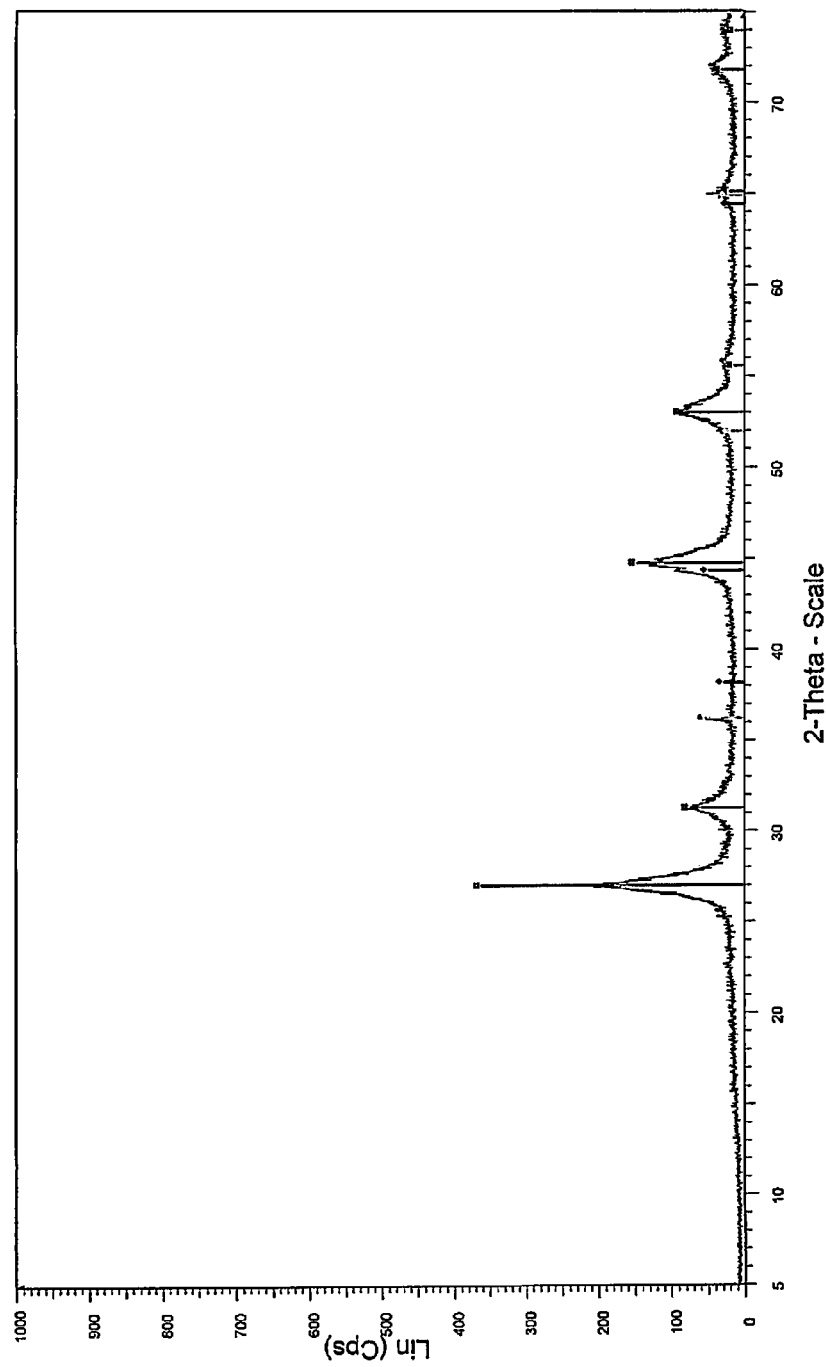
FIG. 9—UEL 11 042 (ochre sample)—lithium sulfide ($Li_2S$) (red lines); lithium (Li) (green lines); lithium hydride (LiH) (blue lines)
Figure 10:
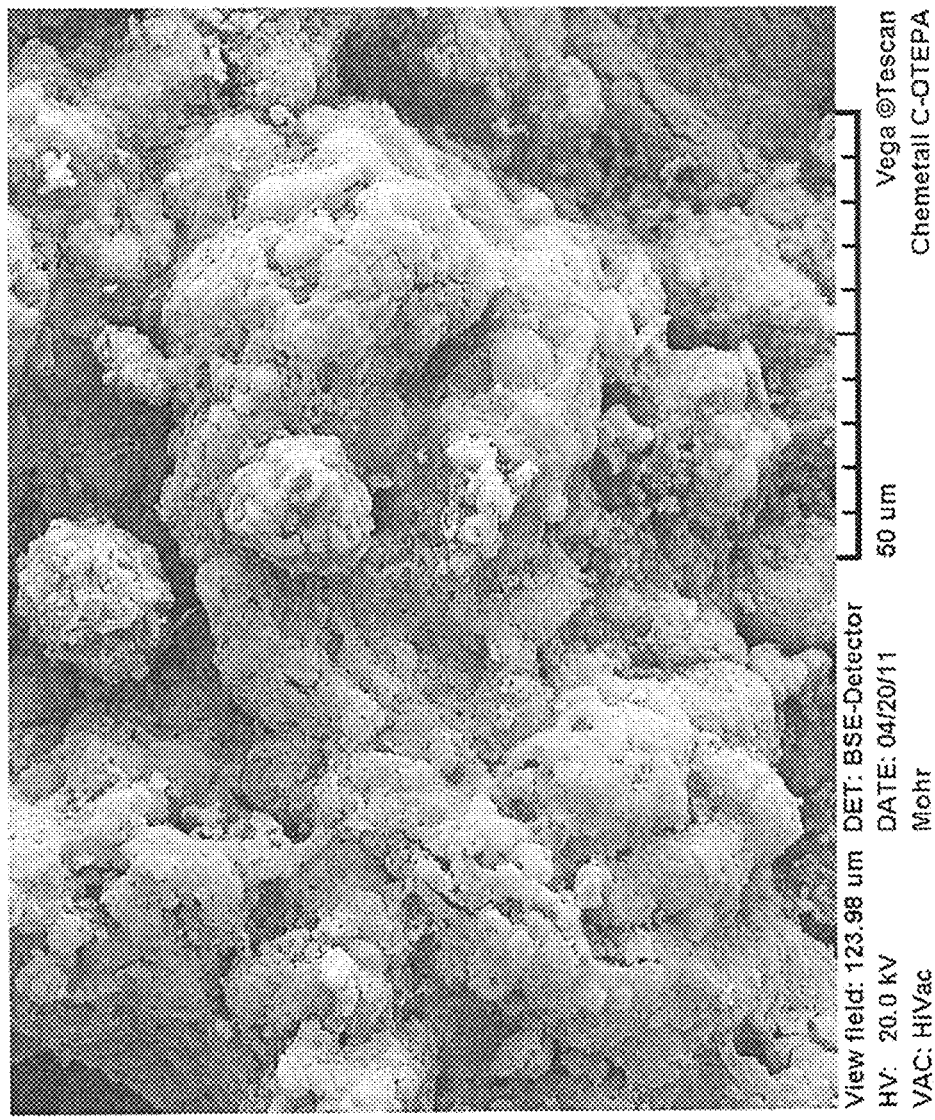
FIG. 10—SEM recording from Example 5

Production of $Li_2S/C$ Composite from Sulfur and Lithium Powder at 190° C. in Tetralin 8.92 g lithium in 556 g tetralin was melted in the reactor according to Example 1. 21.22 g powdered sulfur was metered in in portions over a period of approximately 1 h at an internal temperature of approximately 190° C. After metering was complete, stirring was continued for 2 h at 190° C. The mixture was cooled to 80° C. and then hot-filtered and washed with heptane, and the filter residue was vacuum-dried. 25.4 g of a yellow-ochre product was obtained.
XRD: Lithium sulfide with LiH and metallic lithium impurities (FIG. 9)
SEM: Cauliflower-like surface structure (FIG. 10)
C content: 1.1%
Li content: 41.5 mmol/g; S content: 12.0 mmol/g The examples show that lithium sulfide powder in a pure phase with a large specific surface was formed when saturated hydrocarbon solvents were used. The carbon content in the product increased when $CS_2$ was used. The carbon was present predominantly in elemental form, presumably in a graphitic modification. When an aromatic solvent such as biphenyl was used, a C-doped lithium sulfide was likewise formed; however, this product contained amounts of crystalline lithium carbide and lithium hydride. When partially aromatic solvent such as tetralin was used, the reaction was not complete (elemental lithium remained in the product), and lithium hydride was formed as a by-product. The C content was much lower than when a saturated hydrocarbon solvent was used. The reaction may be brought to completion by longer reaction times and/or stoichiometric changes.

It is claimed:

1. A method for producing a carbon-doped lithium sulfide powder, comprising:
    reacting elemental lithium with a sulfur source selected from the group consisting of elemental sulfur and a sulfur-containing compound;
    wherein the sulfur containing compound is selected from the group consisting of $CS_2$, COS, $SO_2$, and SO, in a liquid state in a hydrocarbon solvent; and
    wherein the hydrocarbon solvent is not naphthalene.

2. A method according to claim 1, wherein the reaction is carried out at a temperature of from 120° C. to 300° C.

3. A method according to claim 1, wherein the solvent is a saturated hydrocarbon solvent which has a boiling point of at least 120° C.

4. A method according to claim 1, wherein the hydrocarbon solvent comprises at least one member selected from the group consisting of octane, nonane, decane, undecane and dodecane.

5. A method according to claim 1, wherein the hydrocarbon solvent is a paraffin boiling fraction.

6. A method according to claim 1, wherein the sulfur source comprises a mixture of elemental sulfur and carbon disulfide.

7. A method according to claim 1, wherein the sulfur source is used in the stoichiometry necessary for completion of the reaction.

8. A method according to claim 6, wherein the molar ratio of sulfur to carbon disulfide varies between 99:1 and 1:99.

9. A method according to claim 1, wherein the method is carried out as a one-step process.

10. A lithium sulfide/carbon composite material which is obtainable by a method according to claim 1.

11. A lithium sulfide/carbon composite material according to claim 10, wherein the composite material has a carbon content of from 0.5% to 50%.

12. A lithium battery having an electrode comprising the lithium sulfide/carbon composite material of claim 10.

13. A lithium ion-conductive solid comprising the lithium sulfide/carbon composite material according to claim 10.

14. A lithium battery comprising an electrode and a separator, wherein the separator comprises a lithium sulfide/carbon composite material according to claim 10.

15. A method according to claim 1, wherein the reaction is carried out at a temperature of from 150° C. to 250° C.

16. A method according to claim 1, wherein the sulfur source comprises elemental sulfur.

17. A method according to claim 1, wherein the sulfur source comprises carbon disulfide.

18. A method according to claim 1, wherein the sulfur source is present in an excess of 1% to 30 mol-%.

19. A method according to claim 6, wherein the molar ratio of sulfur to carbon disulfide is between 50:50 and 95:5.

20. A method according to claim 1, wherein the method is a one-vessel process.

21. A lithium sulfide/carbon composite material according to claim 10, having a carbon content of from 1% to 20%.

* * * * *